(12) United States Patent
Paule et al.

(10) Patent No.: US 6,312,007 B1
(45) Date of Patent: Nov. 6, 2001

(54) STRUCTURAL UNIT FOR A GAS BAG MODULE AND GAS BAG MODULE

(75) Inventors: Thomas Paule, Glattbach; Dominik Schütz, Waldaschaff, both of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/596,118

(22) Filed: Jun. 16, 2000

(30) Foreign Application Priority Data

Jun. 18, 1999 (DE) .......................................... 299 10 711 U

(51) Int. Cl.[7] .................................................. B60R 21/16
(52) U.S. Cl. ...................................... 280/728.1; 280/728.2
(58) Field of Search .............................. 280/728.1, 728.2, 280/731

(56) References Cited

U.S. PATENT DOCUMENTS

| | | | |
|---|---|---|---|
| 5,700,029 | * 12/1997 | Enders | 280/728.2 |
| 5,765,865 | * 6/1998 | Nagata et al. | 280/731 |
| 5,794,968 | * 8/1998 | Yamamoto et al. | 280/728.2 |
| 5,833,262 | * 11/1998 | Fujita et al. | 280/728.2 |
| 5,873,596 | * 2/1999 | Kantoh et al. | 280/728.2 |
| 5,904,366 | * 5/1999 | Nishijima et al. | 280/728.2 |
| 5,992,874 | * 11/1999 | Sugiyama et al. | 280/728.2 |
| 6,042,147 | * 3/2000 | Nishijima et al. | 280/743.1 |
| 6,053,528 | * 4/2000 | Marx et al. | 280/728.3 |
| 6,079,737 | * 6/2000 | Isomura et al. | 280/731 |
| 6,109,646 | * 8/2000 | Nagata et al. | 280/731 |
| 6,113,136 | * 9/2000 | Hamada et al. | 280/731 |
| 6,119,545 | * 9/2000 | Hosoi et al. | 74/552 |
| 6,126,193 | * 10/2000 | Hosoi et al. | 280/731 |

* cited by examiner

Primary Examiner—J. J. Swann
Assistant Examiner—L. Lum
(74) Attorney, Agent, or Firm—Tarolli, Sundheim, Covell, Tummino & Szabo L.L.P.

(57) ABSTRACT

The invention relates to a structural unit for a gas bag module, in particular for a steering wheel gas bag module. The unit comprises a gas bag, a gas generator carrier and a covering cap which consists of plastic material. The covering cap and the gas generator carrier form an accommodation space for the gas bag. The gas generator carrier consists of a punched out and deformed sheet metal section having an edge side incorporated in a form-fitting manner into the covering cap. The sheet metal section is provided with tongues which are able to be bent inwards and towards each other so as to limit the accommodation space and close it at a rear side. Further, the invention relates to a gas bag module comprising the structural unit according to the invention.

12 Claims, 5 Drawing Sheets

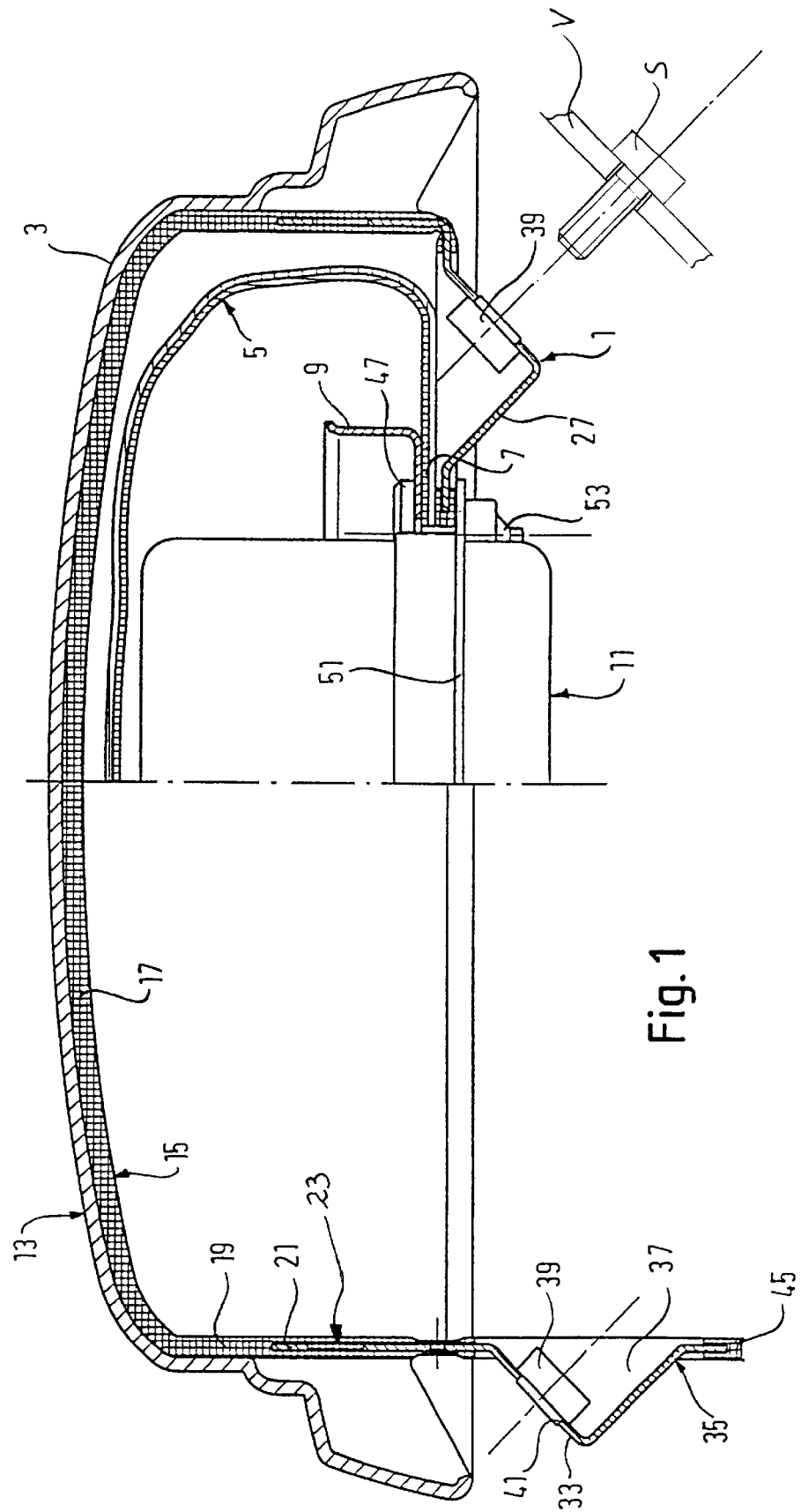

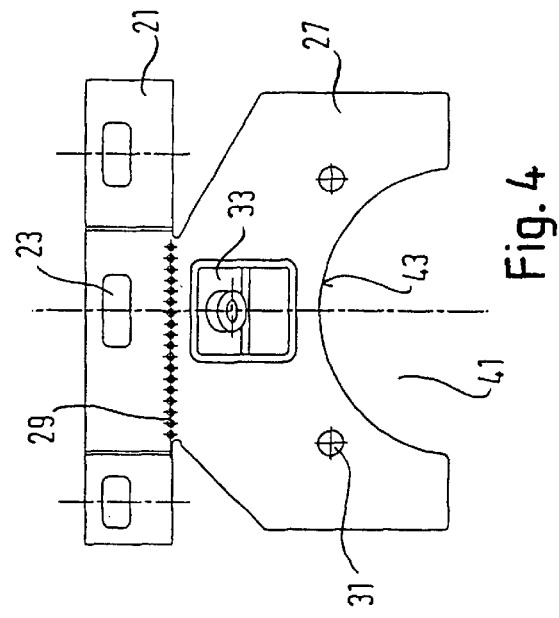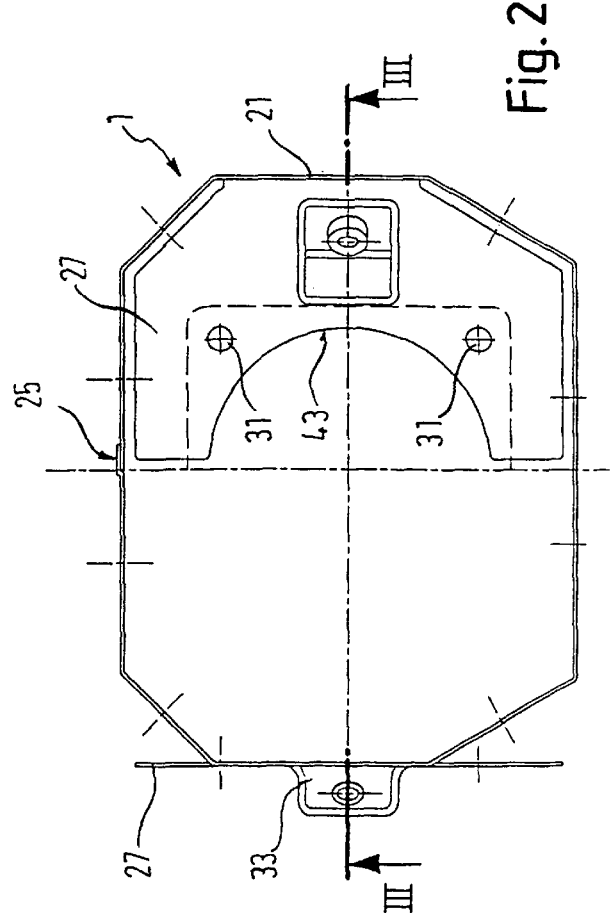

STRUCTURAL UNIT FOR A GAS BAG MODULE AND GAS BAG MODULE

TECHNICAL FIELD

The invention relates to a structural unit for a gas bag module, in particular for a steering wheel gas bag module. The invention furthermore relates to a gas bag module.

BACKGROUND OF THE INVENTION

The covering cap of a steering wheel gas bag module is usually of plastic and is visible on the front face in the installed state of the module. The gas generator and the gas bag are inserted on the rear face into the container-shaped covering cap. A so-called gas generator carrier of sheet metal is fastened to the covering cap by means of rivets or hooks and forms the rear face of the covering cap which is to be closed after the insertion of the gas bag and the gas generator. The gas generator is fastened to this gas generator carrier and the entire module is attached to the steering wheel via this carrier. It is therefore obvious that the gas generator carrier must be constructed so as to be very stable and the connection between gas generator carrier and covering cap must withstand high tensile forces. On opening of the covering cap by the unfolding gas bag, in fact high forces are exerted onto the covering cap and hence onto the connection between covering cap and gas generator carrier.

The connections hitherto of gas generator carrier and covering cap, namely rivets and hooks, led to high pressures on the faces of the rivet- or hook apertures. The risk of the plastic covering cap tearing out was reduced by complicated undercuts to receive forces in the cap, which, however, were only able to be realized by costly injection tools. In addition, the rivets or hooks had to be placed as far away from the gas bag as possible and hence close to the rear face of the covering cap, so that a contact with the gas bag and a tearing of the gas bag by the rivets is avoided. This means, however, that the rivets had to be arranged very close to the rear edge of the covering cap, possibly even additional structural space was required in order to prevent a tearing out of the covering cap. The connection of covering cap and gas generator carrier by means of rivets or the bending of hooks is, in addition, very costly.

BRIEF SUMMARY OF THE INVENTION

The invention provides a simple and stable structural unit for a gas bag module, in particular a steering wheel gas bag module, which is distinguished in addition also by a small structural space and a connection, transferring high forces, between the gas generator carrier and the covering cap. This is achieved in a structural unit which comprises a gas bag, a gas generator carrier and a covering cap which consists of plastic material. The covering cap and the gas generator carrier limit an accommodation space for the gas bag. The gas generator carrier consists of a punched out and deformed sheet metal section having an edge side incorporated in a form-fitting manner into the covering cap. The sheet metal section is provided with tongues which are able to be bent inwards and towards each other so as to form the accommodation space and close it at a rear side. In the structural unit according to the invention, no additional parts such as rivets or hooks formed on the gas generator carrier are necessary. Rather, the gas generator carrier is itself incorporated into the covering cap, i.e. it is embedded into it in a form-fitting manner. An optimum embedding of the sheet metal section into the covering cap can be achieved in that the sheet metal section has recesses or projections which are penetrated by the covering cap. The inwardly bent tongues define a stable mounting base together with other parts of the gas bag module, e.g. with the gas generator and the holding plate for the gas bag.

Preferably, during the production of the covering cap by casting technique or by injection molding technique, the sheet metal section is incorporated into it in a form-fitting manner. The liquid plastic can then also actually fill all the recesses in the gas generator carrier.

The tongues are able to be folded over approximately at right-angles around bending lines, along which in the sheet metal section a weakened zone of material, e.g. a perforation, is formed.

The stability of the entire housing can be increased in that the sheet metal section has a marginal zone which is deformed by folding or the like into a surrounding rim. In this surrounding rim, the sheet metal section can be embedded into the covering cap. This marginal zone also preferably has the recesses for the form-fitting engagement of the plastic material.

According to the preferred embodiment, the sheet metal section has several tongues which are able to be bent over, which are arranged on the surrounding rim preferably in pairs lying opposite each other.

The rear face of the housing of the gas bag module formed by the covering cap and the gas generator carrier is then closed by the bending over of the tongues, after the gas bag with gas bag holding plate and possibly also the gas generator (depending on the system which is aimed for) have been inserted into the covering cap.

A space-saving possibility for fastening the structural unit according to the invention to the vehicle is achieved in that the tongues have at least one outwardly projecting mounting flange each. In addition, the tongues can carry fastening means, by means of which the gas bag module is arrested on the vehicle. As fastening means here, for example, so-called snap-in bolts, press-in nuts or the like are possible, which are attached to the tongues. Also other fastening means are able to be integrated very simply into the tongues.

At their free edge, the tongues have in addition a plastic border which facilitates a gripping of this free edge. The free edge having the plastic border can, furthermore, serve to establish the horn contact, the exact positioning of the gas generator in axial direction, so that it projects from the module in a defined manner, or the guidance of the gas bag module. The plastic border permits a complicated shaping.

After the folding over of the tongues through approximately 90°, these form sections of a base region which has a recess for the arrangement of the gas generator and also openings for connecting screws. The gas generator can project through this recess outwards from the housing of the gas bag module. The openings for the connecting screws permit the arresting of the gas generator and of a gas bag holding plate on the gas generator carrier. Thereby, all the individual parts are connected to a gas bag module, in which the rim of the inflation opening of the gas bag is clamped between the gas bag holding plate and the free edge of the tongues.

The invention further relates to a gas bag module, comprising a structural unit according to the invention, in which the tongues, after folding over through approximately 90°, form one section each of a base region, which has a recess for the arrangement of the gas generator and also openings for connecting screws. By means of the connecting screws, a gas bag holding plate as part of the gas bag module and a flange of the gas generator with the gas generator carrier are combined into the gas bag module. The rim of the inflation opening of the gas bag is clamped between the gas bag holding plate and the free rim of the tongues. The gas bag module according to the invention is distinguished by a simple and stable connection of gas bag holding plate with gas generator and gas generator carrier. Furthermore, the tongues are fastened to the covering cap in a stable manner. The gas generator is immediately, i.e. directly, attached to the tongues, i.e. no additional parts are arranged between the tongues and the gas generator. The gas generator, the tongues and the holding plate complete each other to define a stable base. Via the stable mounting base the module is attached to the vehicle.

BRIEF DESCRIPTION OF THE DRAWINGS

FIG. 1 shows a cross-sectional view through an embodiment of the structural unit according to the invention, the left-hand half showing the structural unit with open tongue and the right-hand half showing the entire gas bag module with structural unit according to the invention, with inserted gas bag and gas generator with the tongue folded over, FIG. 2 shows a reduced top view of the gas generator carrier not yet incorporated into the covering cap, FIG. 3 shows a sectional view of the gas generator carrier according to the line III—III in FIG. 2, FIG. 4 shows a side view of the gas generator carrier.

DETAILED DESCRIPTION OF THE PREFERRED EMBODIMENTS

Figure 5:
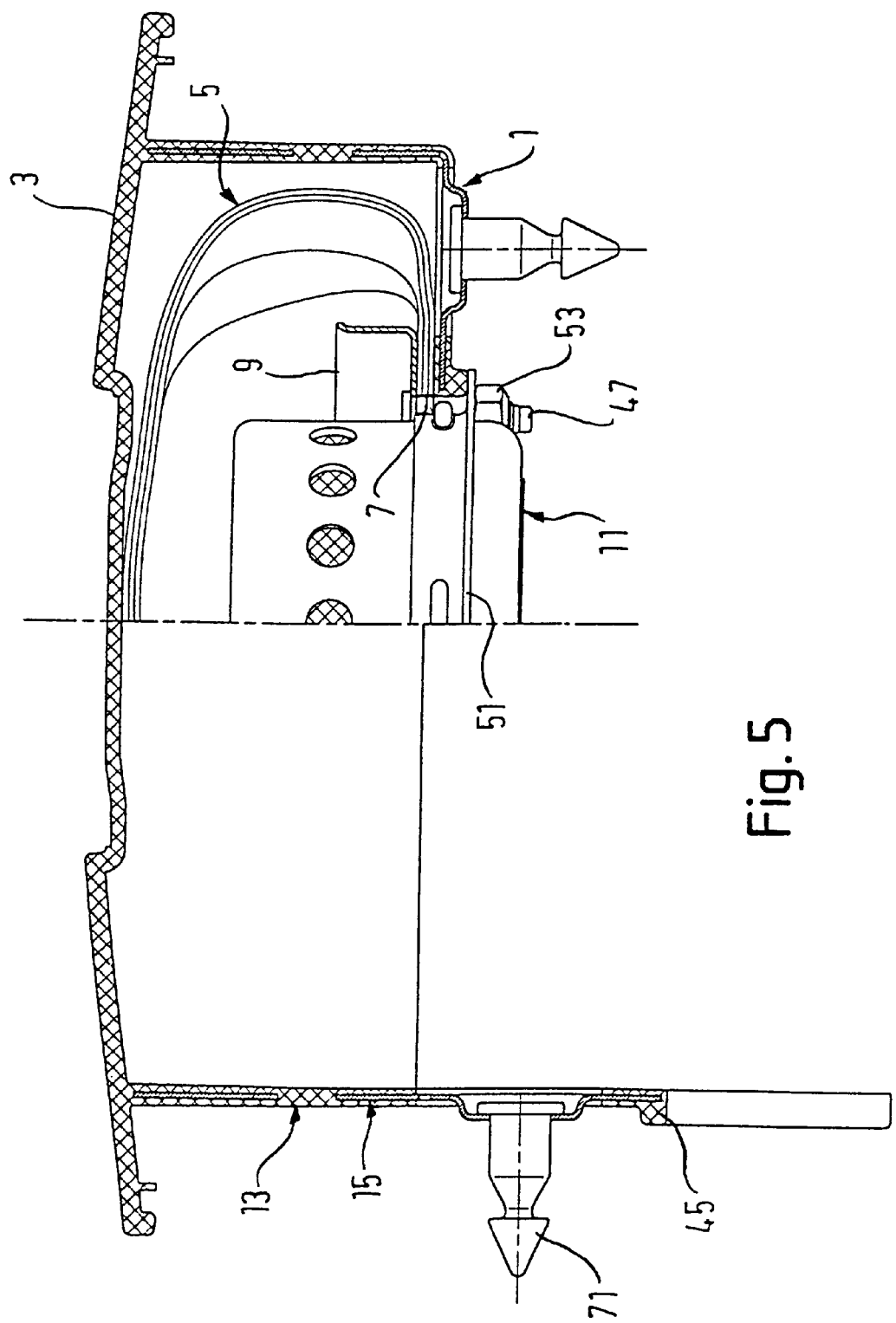
FIG. 5 shows a cross-sectional view through a further embodiment of the structural unit according to the invention, the left-hand half again also showing the structural unit with open tongue and the right-hand half showing the entire gas bag module with structural unit according to the invention, with inserted gas bag and gas generator with folded-over tongue.

In FIG. 1, in the right-hand half a gas bag module is illustrated which has, inter alia, the following parts: a structural unit for the gas bag module, consisting of a gas generator carrier 1, which is formed by a punched-out and deformed sheet metal section, and consisting of a cup-shaped covering cap 3. In addition, the gas bag module has a folded gas bag 5, accommodated in the covering cap 3, a gas bag holding plate 9 surrounding on the inner side the rim 7 of the so-called inflation opening of the gas bag 5, and a gas generator 11 largely projecting into the interior of the covering cap 3.

The covering cap 3 is a so-called two-component covering cap, with a haptically and visually pleasant outer layer 13 and a hard inner carrier layer 15. The layer 15 has a front wall 17 and a surrounding side wall 19. With the production of the covering cap 3 by casting technique, a rim 21 of the gas generator carrier 1 is incorporated or embedded into the side wall 19. In so doing, the rim 21 is incorporated by injection molding or embedding in foam, whereby between the gas generator carrier 1 and the layer 15 of the covering cap 3 not only an adhesive but also a form-fitting connection is effected.

To provide an optimum connection, transferring high forces between the gas generator carrier 1 and the covering cap 13, the gas generator carrier 1 has numerous recesses 23 in the rim 21, which can be readily seen in FIG. 3. With the production of the covering cap 1 by casting technique, thereby plastic penetrates into the recesses 23, so that a form fit results between the covering cap 3 and gas generator carrier 1.

Hereinbelow, with the aid of FIGS. 2 to 4, the design of the gas generator carrier 1 is explained in further detail, before the details of the gas bag module shown in FIG. 1 are further explained.

Figure 6:
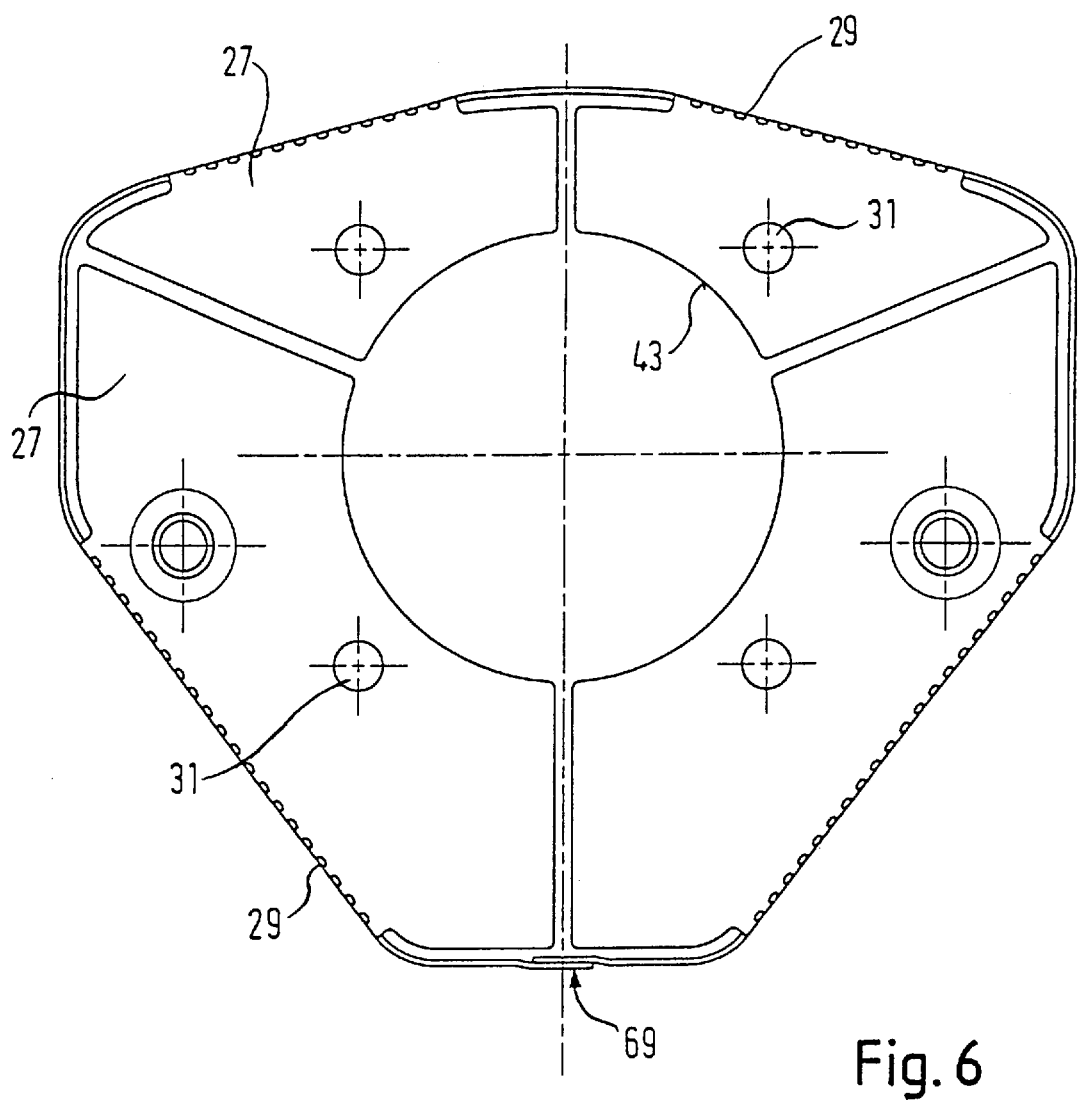
FIG. 6 shows a top view of the gas generator carrier not yet embedded into the covering cap, which carrier is illustrated in the embodiment according to FIG. 5.

The gas generator carrier 1 is produced from a punched-out sheet metal section by deformation. The rim 21, already explained, is formed by folding the marginal region of the sheet metal section. So that the rim 21 is also completely surrounding (cf. FIG. 2), it can be necessary to connect folded sections with each other e.g. by spot welding or by casting by means of plastic which penetrates recesses 23 lying one over another. The spot welding is indicated in FIG. 2 at the position marked by 25 and the casting by means of plastic is indicated in FIG. 6 at the position marked by 69. As can be further seen from FIG. 2, the rim has on its entire periphery numerous recesses 23 spaced apart from each other. At opposite sides of the rim 21, two tongues 27 are formed in one piece onto the rim 21. In the transition region, a perforation or zone of weakened material 29 is provided, which defines a hinge for the bending around of the tongues 27. The two tongues 27 form each a half of a base region of the housing of the gas bag module, which is formed from the cup-shaped covering cap 3 and the gas generator carrier 1. Through the tongues 27, the housing can be closed, the tongues forming the base region of the housing. The tongues 27 have recesses 31 which serve for the arresting of the gas generator 11. Furthermore, on each tongue 27 a mounting flange 33 is formed, projecting outwards at approximately 45°. The mounting flange 33 is formed by an area of a roof-shaped local deformation 35 in each tongue 27. The recess 37 resulting through the deformation can serve to accommodate a screw head or a nut 39 which is welded to the mounting flange 33. A port in the mounting flange 33 is designated by 41.

The gas generator carrier 1 is distinguished by a simple manufacture and a high stability, because the rim 21 is surrounding and closed, so that it forms a type of frame.

Each tongue 27 has a semicircular, large recess 41 which, when both tongues 27 are folded inwards, supplement each other to form a circular recess. The tongues are folded over so far that they form a mounting base which lies in a common plane. In the region of the recesses 41, each tongue has a free rim 43. On injection-molding of the covering cap 3, to the free rim 43 of each tongue 27 a so-called plastic border 45 is molded, which can be seen particularly well in FIG. 1 in the left-hand half.

A possibility for the assembly of the gas bag module according to the invention is explained hereinbelow.

In the not yet installed state, the two tongues 27, as illustrated on the left in FIG. 1, project downwards, so that the covering cap 3 is completely open. The gas bag 5 with the gas bag holding plate 9 situated therein is then placed into the covering cap 3, several connecting screws 47, the head of which lies inside the gas bag, being already introduced and projecting through openings in the gas bag holding plate 9 and in the gas bag 5. Then the tongues 27 are bent inwards through 90°, so that the connecting screws 47 penetrate through the openings 31. Finally, the gas generator 11 is inserted from below via the opening formed by the recesses 41, until a flange 51, protruding radially on its housing, lies against the tongues 27. Hence, the gas generator 11 is fastened directly to the gas generator carrier without an intermediate part being inserted. The flange 51 also has openings (not shown) through which the connecting screws 47 can extend. Nuts 53 are finally screwed onto the shaft ends of the connecting screws 47. Thereby, between the head of the connecting screws 47 and the nut, the gas bag holding plate 9, the rim 7 of the gas bag, the rim 43 of the tongues 27 with the plastic border 45 and the flange 51 are clamped to each other. These parts are thereby firmly connected with each other and stabilize each other, so that the gas generator carrier 1 forms a stable mounting base for the entire gas bag module with the parts fastened to it, which must be fastened in the vehicle.

This fastening of the gas bag module to the vehicle takes place by screws, which can be screwed in through the openings 41 into the nuts 39. On the right-hand side of FIG. 1 there can be seen a >Screw S as well as a section V of the steering wheel structure on the vehicle side. Thereby, the mounting flange 7 is pressed against section V of the steering wheel, otherwise not illustrated, and is arrested thereon. The mounting flanges protruding at 45° permit an easy screwing of the gas bag module obliquely from the rear face of the hub of the steering wheel, whereby a good accessibility for installation results.

On unfolding of the gas bag, the covering cap 3 is torn open on the front face, so that the gas bag can reach in the direction of the occupant. The high forces on tearing open of the covering cap 3, introduced therein, are introduced into the steering wheel via the stable connection with the gas generator carrier 1. A tearing out of the connection between covering cap 3 and gas generator carrier 1 can be avoided by the embedding of the gas generator carrier 1 into the covering cap 3.

The embodiment illustrated in FIG. 5 corresponds substantially to the one already previously explained. However, no mounting flange projecting at 45° is present here. Rather, the base region which is formed by the tongues 27 extends substantially 90° to the side wall 19. As fastening means, on each tongue 27 a so-called snap-in bolt 71 is fastened, which permits a latching connection of the gas bag module to the vehicle. The latching bolts 71 are pressed into the tongues 27 in a force-fitting manner.

As a further difference, not only two but in total even four tongues 27 are provided, which after bending through 90° form the base region of the module. The tongues 27 adjoin each other peripherally.

Figure 7:
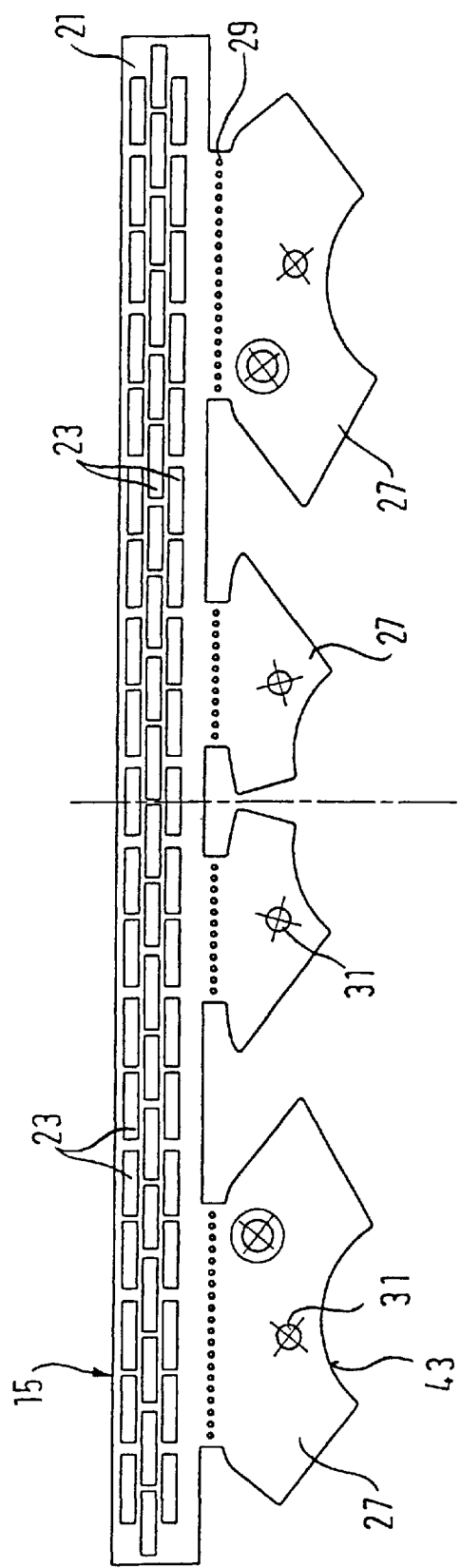
FIG. 7 shows a development of the gas generator carrier illustrated in FIG. 6, before its further processing.

In FIG. 7 it is further illustrated that the surrounding rim 21 has several recesses 23, arranged in succession transversely to the circumferential direction, i.e. in axial direction of the gas generator. More precisely, three rows of successive recesses are provided, the individual recesses of adjacent rows being staggered with respect to each other. The rim 21 is thereby given a deformable region in which the stability of the rim is selectively reduced.

What is claimed is:

1. A structural unit for a gas bag module, in particular for a steering wheel gas bag module, said unit comprising
   a gas bag,
   a gas generator carrier and
   a covering cap which consists of plastic material, said covering cap and said gas generator carrier limiting an accommodation space for said gas bag and said gas generator carrier consisting of a punched out and deformed sheet metal section having an edge side embedded in a form-fitting manner into said covering cap, said sheet metal section being provided with tongues which are able to be bent inwards and towards each other so as to form said accommodation space and close said accommodation space at a rear side of said accommodation space.

2. The structural unit according to claim 1, wherein bending lines are provided in said sheet metal section and wherein said tongues are able to be bent over approximately at right-angles about said bending lines which form a zone of weakened material in said sheet metal section.

3. The structural unit according to claim 2, wherein said zone of weakened material is formed by perforating.

4. The structural unit according to claim 1, wherein said sheet metal section has a marginal region which is a surrounding rim.

5. The structural unit according to claim 4, wherein in said marginal region recesses are provided for receipt of said plastic material of said covering cap.

6. The structural unit according to claim 5, wherein said surrounding rim has several recesses arranged in succession transversely to a circumferential direction.

7. The structural unit according to claim 4, wherein said gas generator carrier has several tongues able to be bent over, which are arranged on said surrounding rim.

8. The structural unit according to claim 7, wherein said tongues have at least one mounting flange each projecting outwards at approximately 45°, said tongues having a free edge provided with a plastic border.

9. The structural unit according to claim 7, wherein on said tongues fastening devices are provided for fastening said module on a vehicle.

10. A gas bag module, comprising
   a structural unit for a gas bag module, in particular for a steering wheel gas bag module, said unit comprising a gas bag, a gas generator carrier and a covering cap which consists of plastic material, said covering cap and said gas generator carrier limiting an accommodation space for said gas bag and said gas generator carrier consisting of a punched out and deformed sheet metal section having an edge side incorporated in a form-fitting manner into said covering cap, said sheet metal section being provided with tongues which are able to be bent inwards and towards each other so as to form said accommodation space and close it at a rear side,
   a base region,
   a gas bag holding plate and
   a gas generator,
   said tongues, after bending about approximately 90°, forming a section each of said base region, which has a recess for receiving said gas generator and also openings for connecting screws, by means of which said gas bag holding plate as part of said gas bag module and a flange of said gas generator together with said gas generator carrier are combined into said gas bag module,
   said gas bag having an inflation opening which is defined by a rim of said gas bag, and
   said rim of said inflation opening of said gas bag being clamped between said gas bag holding plate and a free rim of said tongues.

11. A gas bag module according to claim 10, wherein said gas generator is directly attached to said tongues.

12. A gas bag module according to claim 10, wherein said tongues lie in a common plane.

* * * * *